Patented July 5, 1949

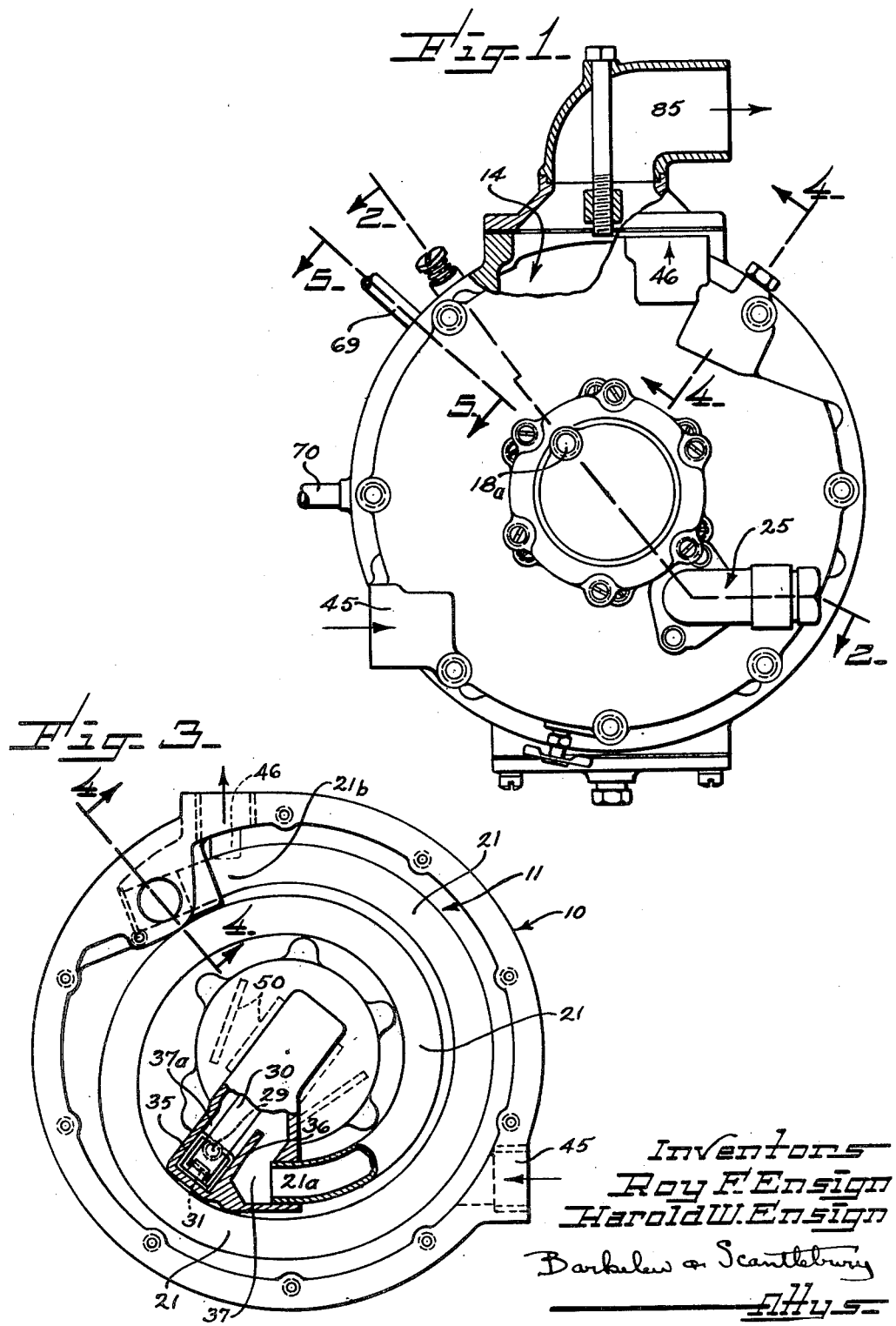

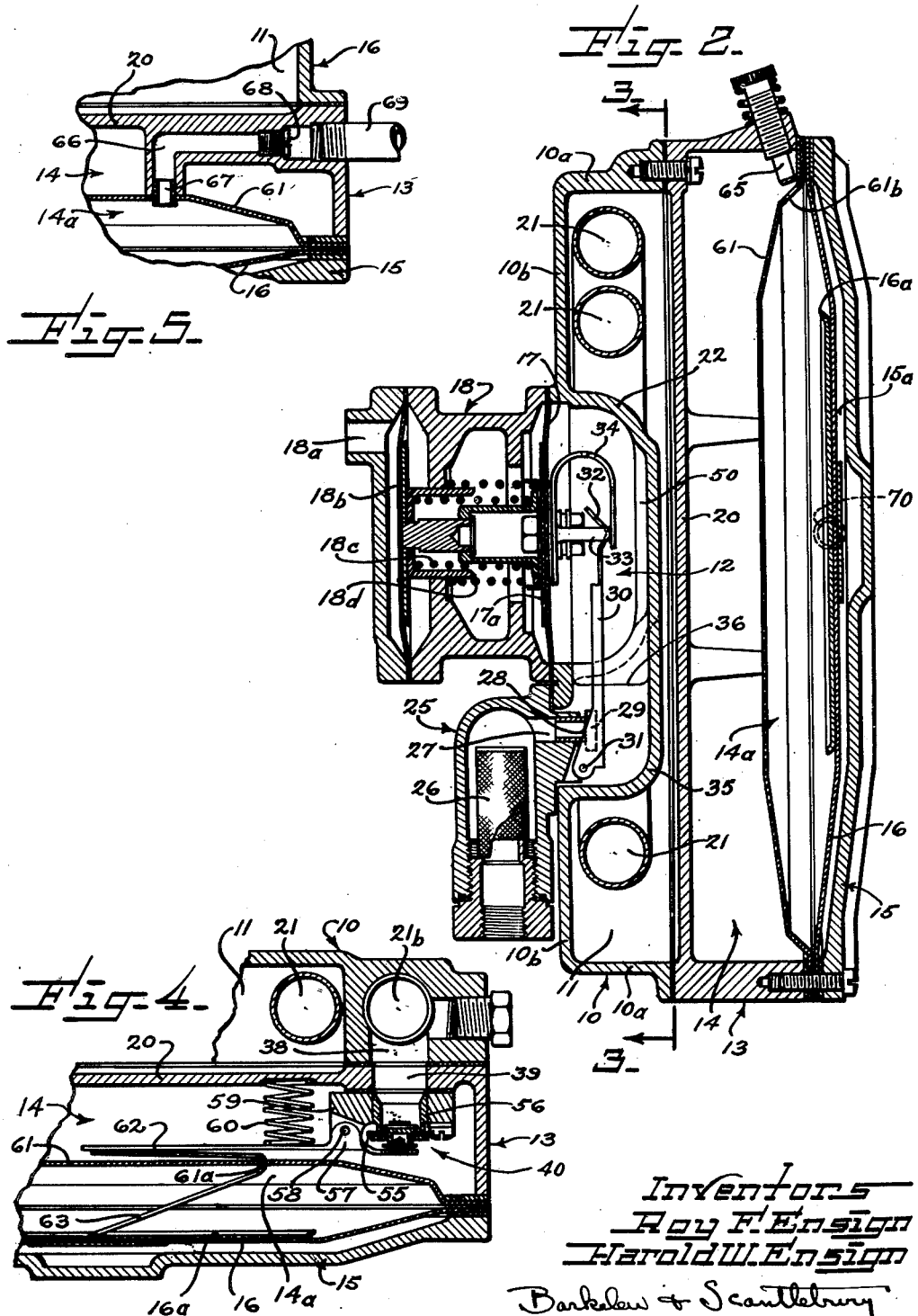

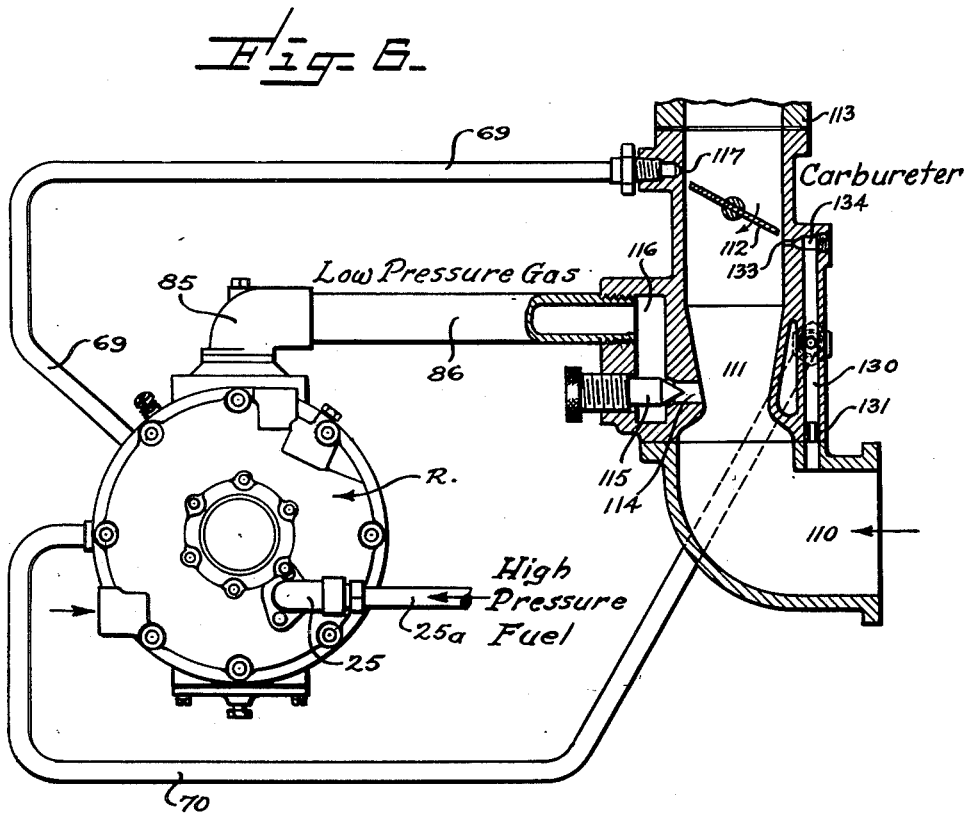

2,475,087

UNITED STATES PATENT OFFICE 2,475,087

PRESSURE REGULATOR AND VAPORIZER, PARTICULARLY FOR VOLATILE LIQUID FUELS

Roy F. Ensign, San Marino, and Harold W. Ensign, Los Angeles, Calif., assignors to Ensign Carburetor Company, Huntington Park, Calif., a corporation of California Application September 29, 1947, Serial No. 776,844

6 Claims. (Cl. 257—2)

This invention has to do generally with devices designed for reducing and regulating the pressure of fluids initially derived from a high pressure source, and more particularly for reducing and regulating the pressure of, and at the same time vaporizing, volatile fuels. The typical present use of the invention is with relation to feeding internal combustion engines with fuel gas; and the invention will therefore be explained in detail in a typical and illustrative form as designed for that particular use, but without limitation to that use except as may hereinafter be stated in the following claims. The invention herein, in some of its aspects, is in the nature of improvements upon the "Liquid gas converter and regulator" on which Patent 2,248,222 issued on July 8, 1941.

In the use of such volatile fuels as propane and butane for devices requiring gas at a relatively low pressure, for instance internal combustion engines, several problems are encountered due to the large range through which the pressure must be reduced, and due to the fact that heat must be added to the expanding gases to keep them in dry gaseous form. These difficulties, and the general objectives of a vaporizing and pressure regulating device are more fully set out in said previously issued patent and need not be explained in detail here. The general objectives of the present invention are substantially the same as set out in said patent; the particular objectives include, among other things, the provision of a simpler and more efficient device for the purposes stated. Other objects and corresponding accomplishments of the present invention will best appear from the following detailed description of a preferred and illustrative form of the invention, with reference to the accompanying drawings in which Fig. 1 is an elevation, with parts broken away, of the improved regulator and vaporizer;

Fig. 2 is a section, at enlarged scale taken as indicated by line 2—2 on Fig. 1;

Fig. 3 is a section, taken as indicated by line 3—3 on Fig. 2 but at the relatively reduced scale of Fig. 1 and having parts broken away for illustrative purposes;

Fig. 4 is a detail fragmentary section taken as indicated by lines 4—4 on Figs. 1 and 3, but at the enlarged scale of Fig. 2;

Fig. 5 is a detail fragmentary section taken as indicated by line 5—5 on Fig. 1 but at the enlarged scale of Fig. 2, and Fig. 6 is a schematic view showing the connections of the vaporizer and regulator to a typical engine carburetor.

As shown in preferred design in the drawings the chamber forming portions of the regulator are made up mainly of a body member 10 which encloses the hot water chamber 11 and also the first stage pressure chamber 12; a secondary body member 13 which, with diaphragm 16, encloses the second stage pressure chamber 14; a cover 15 lying over the second stage diaphragm 16 and forming a reference pressure chamber 15a at the outer face of the diaphragm; and a device of some kind for applying reference pressure to the primary diaphragm 17 which forms one wall of first stage pressure chamber 12. This last mentioned device may embody nothing more than an adjustable spring or a reference pressure chamber mounted in a cover for the primary pressure chamber. However it is here shown as a reference pressure device 18 which applies spring pressure as a reference pressure in such a manner that the reference pressure may be modified by the lubricating oil pressure of the engine. This device, which is the subject-matter of application Ser. No. 689,579, filed by Roy F. Ensign August 9, 1946 for Control of feed pressure for internal combustion engines, is not in and of itself a subject-matter of the present application, and so will be described only briefly.

The general function of device 18 is to apply a normal operating reference pressure to diaphragm 17 only when the pressure on the lubricating oil of an engine has risen to normal or safe operating value. The pressure side of the oil circulating line is connected at 18a to exert pressure on diaphragm 18b to move it to the right and thereby to apply the force of compression spring 18c to diaphragm 17 as a reference pressure. That reference pressure is sufficient to raise the equilibrium pressure in first stage chamber 12 to a value which will enable the second stage valve to pass fluid in full operating quantities. When the system is standing and no pressure is applied to diaphragm 18b the reference pressure of spring 18c is withdrawn from diaphragm 17. Diaphragm 17 then operates under the relatively light reference pressure of a permanently applied spring 18d, or under no reference pressure at all except atmospheric. Under those conditions the equilibrium pressure in chamber 12 is relatively low. The pressure in 12 is one of the forces which tends to open the second stage valve; and with that pressure low, the second stage valve closes more tightly and prevents leakage under standing conditions.

The various parts which make up the main body of the device and enclose the various chambers are all secured together by suitable screws or studs, and with proper gasketing, all of which will be understood without the necessity of detailed illustration.

Body member 10 is generally of flat circular form and, together with the wall 20 of secondary body member 13, encloses a hot water chamber 11 which is generally annular in form and which contains the spirally coiled vaporizing tube 21. Tube 21 is of comparatively large diameter and the coil comprises only a few turns, with the innermost turn of a large enough radius to surround the wall 22 which encloses the primary chamber 12. This wall 22 is preferably formed integrally with the other wall portions of body member 10; and the configuration and arrangement are such that the walled chamber 12 extends into the central portions of water chamber 11 from one side of body member 10. At that side of the body member, the primary chamber 12 has a relatively large opening which is closed by the primary diaphragm 17, and also has a relatively smaller opening to which the high pressure feed fitting 25 is applied. This high pressure feed fitting 25 supplies the high pressure fluid (which may be either liquid or vapor or a mixture) through strainer 26 to the passage 27 leading to valve seat 28 of the first stage pressure regulating valve. As here shown, the valve proper is in the form of a disk 29 mounted in any suitable manner on a valve lever 30 pivoted at 31 to an extension of fitting 25. The free end of valve lever 30 lies under a U-shaped spring clip 34 which is attached to the diaphragm 17 and diaphragm plate 17a. Increase in pressure in chamber 12 tends to move diaphragm 17 to the left in Fig. 2 to close valve 29. Spring 34 is strong enough to close the valve against the high pressure which acts on the valve in a direction to open it; but limits the force that the diaphragm can apply to the valve lever in case the pressure in 12 becomes abnormally high for any reason. On decrease in pressure in chamber 12, diaphragm 17 moves toward the right. On that movement a member or pair of spaced members 33 engage the outer end of spring clip 34 to move that end of the spring toward the right with the diaphragm. The spring pressure on the end of lever 30 is thus relieved, allowing the pressure in valve 29 to open the valve. Although members 33 could directly engage the valve lever to move it in the opening direction, they preferably do not do so but merely move the spring to allow the valve to open.

Fluid enters the first stage pressure chamber 12 from valve 29 through a short passage which is formed by the extension walls 35 (see Fig. 3) and by a partition wall 36 which divides the entry passage from a passage 37 by which the fluid, at first stage pressure, leaves chamber 12 and enters the vaporizing tube 21. The end 21a of the vaporizing tube communicates with passage 37 at a point which is well separated by partition 36 from the entry passage on the other side of that partition. It is found that this simple arrangement eliminates the resonant perpetuation of surges which may otherwise be set up in the operation of the device.

Vaporizing coil 21, surrounding primary chamber 12 and lying in the annular hot water chamber 11, has its outlet end 21b in communication with a passage 38 in body member 10 (see Fig. 4). This passage 38 communicates directly with a registering passage 39 in the body member 13 which encloses the second stage pressure chamber 14. Flow of the fluid through passage 39 and into the secondary pressure chamber is controlled by the second stage regulating valve 40 which acts to reduce the pressure in the secondary chamber 14 to the low pressure required for feed of a carburetor or other gas consuming device.

The reference pressure on first stage diaphragm 17 is usually set to reduce the pressure on the fluid through the major part of its total range of pressure reduction; so that the addition of heat to the fluid at its first stage pressure will be sufficient to keep it in dry gaseous form through its expansion at the low pressure stage. Some heat is of course applied to the low pressure fluid by conduction through wall 20; but it is preferred to add sufficient heat at the first stage of pressure reduction so that heat which may be added at the second or low pressure stage need not be relied upon. The device as shown is very effective in adding heat at the first stage.

Any suitable fluid heating medium may be used in the hot water chamber 11, but where the device is used to feed fuel to an internal combustion engine hot water from the radiating system is used as the heating fluid. The hot water enters chamber 11 through the connection indicated at 45 and leaves the chamber at the connection indicated at 46 (Figs. 1 and 3). The circulating hot water thus completely surrounds vaporizing coil 21 and almost completely surrounds wall 22 of primary chamber 12. It will be noted in Fig. 2 that this wall 22 is well spaced from wall 20 so as to allow hot water flow between the two walls. The interior surface of chamber wall 22 may be provided with projecting ribs 50 (see Fig. 2 and see the dotted indication of such ribs in Figs. 3) for the purpose of increasing the heat conductive surface.

The second stage valve 40 is composed essentially of a flat valve disk 55 and an annular valve seat member 56 which forms a continuation of passage 39 (see Fig. 4). The flat valve disk 55 is mounted on one end of pivoted valve lever 57 in such a manner as to have a loose or universal movement of adjustment to the valve seat. Valve lever 57 is pivoted at 58 to a mounting 59 that surrounds valve seat 56. A spring 60 applied to valve lever 57 supplies the uniform or normal reference pressure for the valve. In this particular instance, where it is designed to have diaphragm 16 only open valve 40 when the pressure in low pressure chamber 14 is sub-atmospheric, spring 60 is applied to valve lever 57 to act on it in a direction to close valve 40.

The secondary or low pressure diaphragm 16 is clamped at its edge between body member 13 and cover 15. The diaphragm thus forms one wall of low pressure chamber 14, and another chamber 15a is enclosed between the diaphragm and cover 15. Another sub chamber wall 61, of thin sheet metal, lies to the left of diaphragm 16 in Fig. 2 and forms a sub chamber 14a immediately adjacent that face of diaphragm 16 which would otherwise be exposed directly in chamber 14. To transmit movement between diaphragm 16 and valve lever 57 a push pin which slides through wall 61 has commonly been used in the past, but it has been found that such a transmissive device is very apt to bind and thus to make the regulator unresponsive. In place of such a push pin I utilize a very simple form of hinge member, consisting of a small rod or bar bent into general hairpin form and passing at its bend loosely through an opening 61a in chamber wall 61. One leg 62 of the hairpin hinge member bears against the free end of valve lever 57, and the other leg 63 rests against diaphragm 16 or its attached diaphragm plate 16a. An opening 61b (Fig. 2) is provided in sub chamber wall 61 to form a connection between main chamber 14 and sub chamber 14a. The effective size of this opening is controlled by a screw-threadedly adjustable pin 65. Momentary changes of pressure may be effected in sub chamber 14a for the purpose of modifying the action of the diaphragm.

As shown in Fig. 5 a passage 66 formed in the structure of body member 13 communicates, via nipple 67 with the interior of sub chamber 14a. A suitable plug 68 with a calibrated orifice through it is located in passage 66, and a connecting tube or pipe 69 serves to apply modifying or controlling pressure to passage 66 and thus to sub chamber 14a.

The chamber 15a, enclosed at one side of diaphragm 16 by cover 15, is the main reference pressure chamber for diaphragm 16. This chamber has a communicating tube 70 in communication with it for the purpose of controllably modifying the reference pressure in the chamber.

Reference now to Fig. 6 and a brief description of the operation of the device in feeding the carburetor of an internal combustion engine will serve best to show how the modifying controls are applied. In Fig. 6 the vaporizer regulator is shown as a unit at R, the high pressure fuel feed line is shown at 25a and the low pressure feed line 86 leads from the low pressure outlet fixture (shown at 85 in Fig. 1) to the gas intake of the carburetor. A typical carburetor as here shown has an air intake at 110 and a Venturi passage 111 communicating with the air intake. Air flow through the carburetor is assumed to be upward, and throttle 112 is located above the venturi. Low pressure gas line 86 communicates with a passage 116 from which the low pressure gas passes through gas orifice 114 under the control of adjustable valve 115 into the Venturi throat. In a position just above throttle 112, and positioned so as to be uncovered to the engine suction when the throttle is in its illustrated idling position, there is a small port 117; and the previously described control tube 69 connects with that orifice. The increased depression in the engine intake manifold at idling is thus communicated via tube 69 to sub chamber 14a and tends to move diaphragm 16 toward the left in Fig. 2, or up in Figs. 4 and 5. That movement up tends to open the secondary valve 40 and thus to somewhat increase the gas pressure in low pressure chamber 14; thus providing the engine with the somewhat richer fuel and air mixture which is desirable for idling operation. The extent to which the depression thus applied to chamber 14a is effective is controlled by the equalization of pressures between 14 and 14a through openings 61a and 61b in wall 61.

The carburetor has a balance passage 130 communicating via a calibrated orifice 131 with the air intake, and via another calibrated orifice 133, subject to adjustment 134, with the mixture passage at a point where the orifice is cut off from manifold suction when the throttle is at idling and exposed to manifold suction as the throttle opens. Control tube 70 leads from reference chamber 15a to passage 130. Subject to modifications, the reference pressure in chamber 15a is the same as the static pressure in the carburetor air intake. When standing idle, atmospheric pressure on opposite sides of diaphragm 16 allows spring 60 to close valve 40. When the engine is turned over for starting with the throttle open, the depression at the Venturi throat, below the static pressure in the air intake and in the mixture passage above the venturi, is communicated to the low pressure chamber 14 and thence to sub-chamber 14a. That depression is sufficient to open valve 40 against the closing action of spring 60. With the engine in normal operation that relative depression in 14 and 14a is sufficient at all times to keep valve 40 open, its amount of opening depending mainly on the variation of the depression at the venturi, which in turn depends on the air velocity through the venturi. In the medium ranges of engine operation, with throttle 112 partly open, orifice 133 is subjected to a small depression from the engine manifold. That depression slightly lowers the pressure in balance passage 130 and in reference chamber 60, tending to move valve 40 slightly in a closing direction and thus cutting down the amount of fuel flowing to chamber 14 and to the carbureter. This action economizes on fuel by providing a relatively lean mixture in medium operating ranges.

These pressure controlling actions, under control of pressures existing in the carbureter, are the same as in Patent 2,248,222 and are not in themselves the subject matter of invention here.

We claim:

1. A unitary pressure regulator and heater including a chamber forming structure comprising a peripheral wall, side walls, and a wall formation extending inwardly centrally from one of the side walls and surrounding a central pressure chamber, the walls also forming a substantially annular chamber around the central wall formation, a pressure responsive diaphragm forming one side of the central pressure chamber in the central wall formation, a pressure inlet communicating with the pressure chamber, diaphragm controlled valvular means controlling said inlet, an outlet for the pressure chamber, a tube coil of spiral form connected at one end with the outlet and lying in the annular chamber around the central wall formation, and means for passing heating fluid through the annular chamber.

2. A unitary pressure regulator and heater as defined in claim 1 and in which the central wall formation which extends inwardly from one side wall is substantially cup-shaped with its cup-bottom near but spaced from the opposite side wall, and with its open cup-top closed by the pressure responsive diaphragm.

3. A unitary pressure regulator and heater as defined in claim 1 and in which the central wall structure is provided with an internal partition which, with said wall structure, forms separated inlet and outlet passages communicating respectively with the pressure inlet and with the outlet.

4. A unitary pressure regulator and heater as defined in claim 1 and in which the central wall structure is provided with an internal partition which, with said wall structure, forms separated inlet and outlet passages communicating respectively with the pressure inlet and with the outlet.

5. A unitary pressure regulator as defined in claim 1 and also including wall structure and a second pressure responsive diaphragm enclosing a second pressure chamber having an inlet and outlet, the other end of the spiral tube coil being connected to said inlet, and valvular means controlled by the second diaphragm and controlling said inlet.

6. A unitary pressure regulator as defined in claim 5 and also including a perforated wall dividing the second pressure chamber into two chambers one of which is immediately adjacent the diaphragm, and means for transmitting diaphragm movements through said division wall to the valvular means, said movement transmitting means embodying a member having two legs extending generally in the same direction from a leg-connecting bend, the bend passing loosely through a wall perforation and thus forming a pivot about which the legs may swing.

ROY F. ENSIGN.
HAROLD W. ENSIGN.

REFERENCES CITED

The following references are of record in the file of this patent:

UNITED STATES PATENTS

| Number | Name | Date |
|---|---|---|
| 1,283,769 | Hofstad | Nov. 5, 1918 |